Aug. 7, 1951 W. E. RUSHING 2,563,279
WIND TURBINE
Filed Jan. 11, 1946 3 Sheets-Sheet 1

INVENTOR.
Wallace E. Rushing
BY
ATTORNEYS.

Aug. 7, 1951 W. E. RUSHING 2,563,279
WIND TURBINE
Filed Jan. 11, 1946 3 Sheets-Sheet 2
FIG. 4.
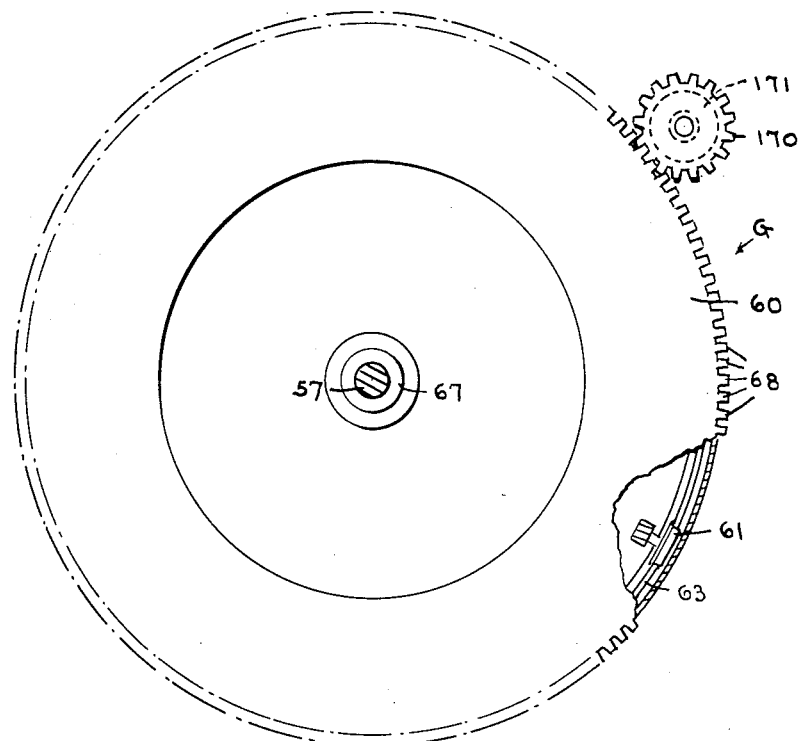
FIG. 5.
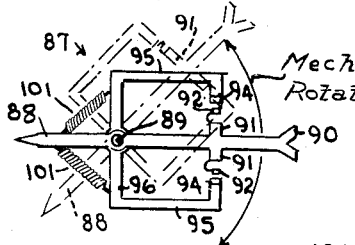
FIG. 7.
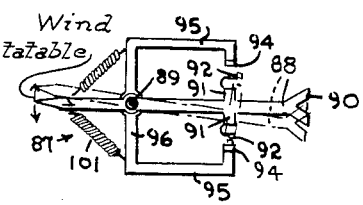
FIG. 6.
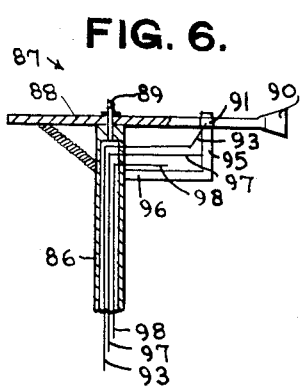
FIG. 8.
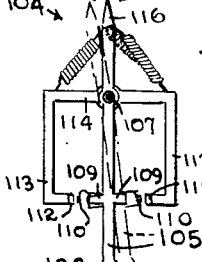
FIG. 9.
INVENTOR.
Wallace E. Rushing
BY Lancaster, Allen & Rommel
ATTORNEYS.

Aug. 7, 1951 W. E. RUSHING 2,563,279
WIND TURBINE

Filed Jan. 11, 1946 3 Sheets-Sheet 3

INVENTOR.
Wallace E. Rushing
BY
ATTORNEYS.

Patented Aug. 7, 1951

2,563,279

UNITED STATES PATENT OFFICE 2,563,279

WIND TURBINE

Wallace E. Rushing, Christobal, Canal Zone

Application January 11, 1946, Serial No. 640,524

9 Claims. (Cl. 170—40)

This invention relates to wind turbines.

An important object of the invention is to provide a wind directing and deflecting housing of novel construction for a wind turbine, whereby a more efficient use is made of the wind available.

Another important object is to provide a novel housing for the impellers of a wind turbine.

Yet another object is to provide a wind turbine, including two sets of impellers, one set rotating contrawise to the other, and both contributing toward the total power developed.

Still another important object is to provide a wind turbine, including impellers of unusually large size, so that the turbine may be employed in the practical commercial development of power. This is made possible by so associating the impellers with the turbine housing that they are supported thereby against wind damage.

A major object is to provide novel mobile supports for the impellers of turbines.

Another major object is to dispense with complicated braces, struts and the like for turbine blades that must resist strong currents, and employ instead, movable supports at the outer ends of the impeller blades.

The novel turbine includes means for rotating the housing thereof, and means is provided to prevent tipping of the housing and associated structure, during such rotation.

Included is novel means for rotating the housing of the turbine so that all, a part, or substantially none of the wind available is employed. Thus, complicated shutters and their manipulators, are dispensed with, as are movable deflectors and the like.

Another object is to provide means for removing ice and snow accumulations from the novel impeller support means of the invention.

Other objects and advantages of the invention will be apparent during the following detailed description of the invention, taken in connection with the accompanying drawings, forming a part of this specification, and in which drawings, Figure 1 is a side elevation of the novel wind turbine with portions of the electric circuits shown diagrammatically.

Figure 4 is a top plan view of a turntable and associated structure forming a part of the turbine, with portions broken away in order to illustrate structure below the turntable.

Figure 5 is a top plan view of mechanically and wind-rotatable switch means showing, in dotted lines, mechanical operation thereof.

Figure 6 is a vertical section thereof.

Figure 7 is a view somewhat like Figure 5 and showing wind operation thereof in dotted lines.

Figure 8 is a top plan view of a wind operated switch means somewhat like that of Figures 5–7.

Figure 9 is a fragmentary transverse section through the lower portion of the housing of Figures 1–3, with heating elements diagrammatically shown.

Figure 1:
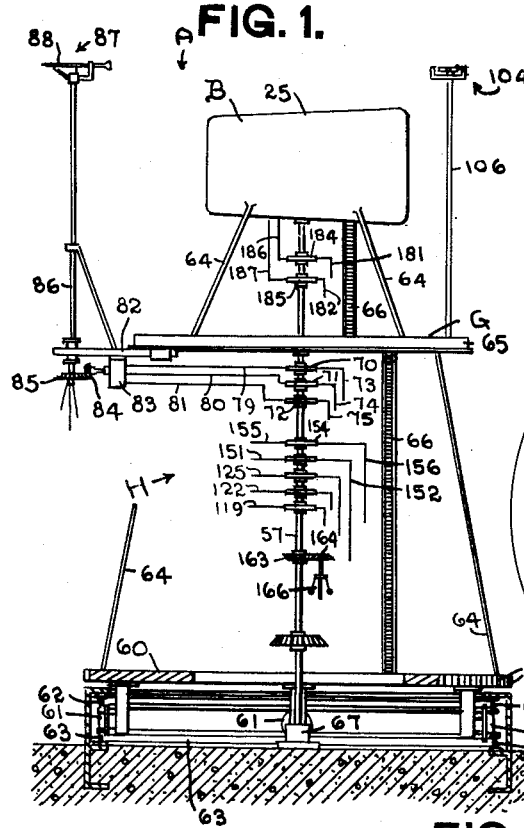

In the accompanying drawings, wherein for the purpose of illustration is shown a preferred embodiment of the invention and wherein similar reference characters designate corresponding parts throughout the several views, the novel wind turbine A includes an impeller housing B, impellers or blades C within the housing B, means D to support the blades, gearing E and shafting F associated with the blades, a support G for the housing and shafting and for the means mentioned, control means H, and means J for removing snow and ice accumulations from portions of the means D.

At the outset it should be appreciated that what is contemplated is the provision, in the wind turbine A, of a large unit capable of furnishing power commercially.

Figure 2:
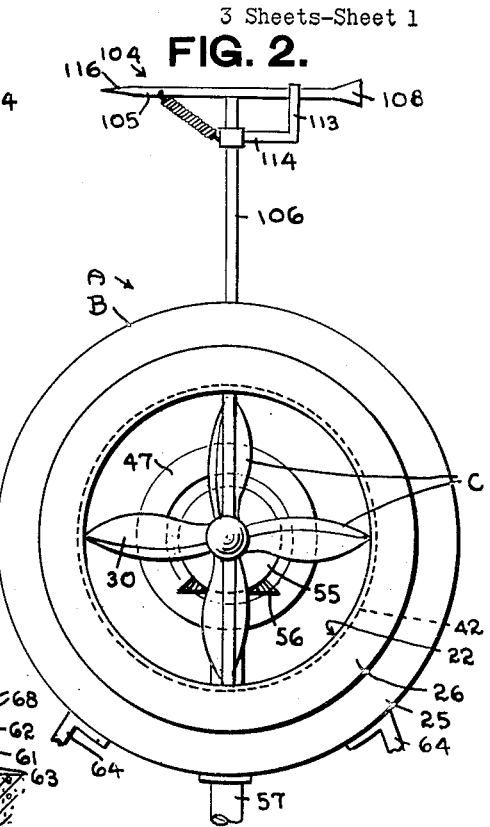
Figure 2 is the induction end elevation of an impeller housing forming a part of the turbine.
Figure 3:
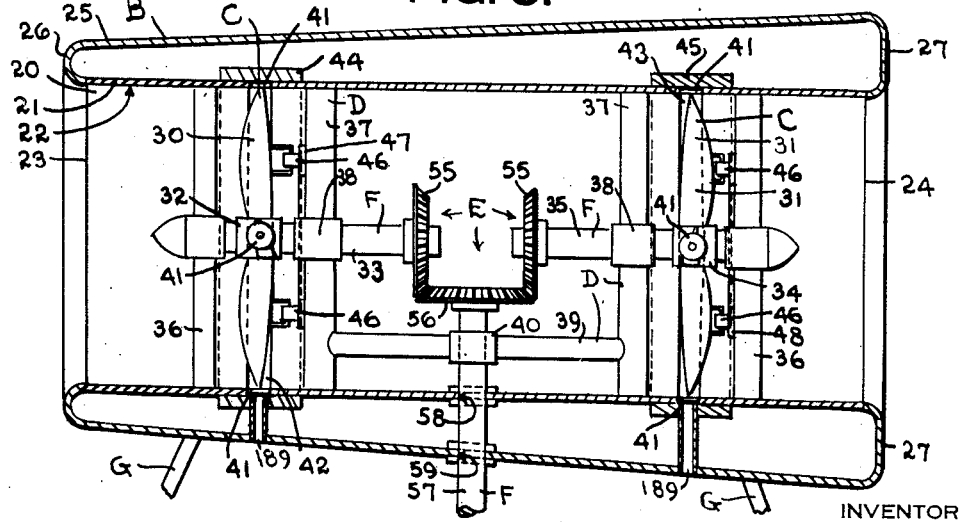
Figure 3 is a vertical longitudinal section of the same housing.

As for the impeller housing B, shown more particularly in Figure 3, this is preferably an open-ended, metal cylinder or body portion 20 having a wall 21 defining a passageway 22, having a substantially like diameter from the induction or front end or mouth 23 of the cylinder to the eduction or rear end 24. These ends are, of course, open and, from them, project a skirt portion 25 of novel shape. The skirt portion 25, shown more particularly in Figures 1, 2 and 3, may be of metal and extends, from the end 23, outwardly by means of an arcuate section 26, which is outwardly convex, thence over the wall 21 toward the end 24 and joins the end 24 also by means of an arcuate section 27, which is outwardly convex. Among the novel features of this skirt portion 25 is that, while it is spaced from the wall 21, it does not parallel this wall, but flares outwardly from the end 23 toward the end 24, so that the surface defined by the outwardly convex section 27 is larger than the opposite surface defined by the outwardly convex section 26. As will be seen in Figure 3 the sections 26 and 27 preferably join the wall 21 so that there are no shoulders to impede wind flow. The skirt portion 25 may be secured to the wall 21 in any approved way, as by bolting or welding. Various openings in the wall 21 and skirt portion 25 will be described in connection with other parts of the assembly. From the above, it will be seen that the skirt portion 25 wholly envelops the periphery of the body portion 20 or wall 21.

The blades or impellers C shown particularly in Figures 2 and 3, are preferably in two spaced-apart sets 30 and 31, arranged and disposed within the housing B so one will rotate contrawise to the other. That is, the set 30 faces the mouth 23 and the set 31 faces the end 24. The boss 32, carrying the blade set 30, is fixed to a substantially horizontally disposed shaft 33 extending toward the vertical center of the housing B and the boss 34 carrying the blade set 31 is fixed to a substantially horizontally disposed shaft 35 also extending toward the vertical center of the housing B, with the axes of the shafts substantially in the same straight line.

The shafts 33 and 35 may be supported by portions of the means D, including suitable sets of inner and outer struts 36 and 37, conventionally streamlined if desired. These struts, of course, aid in bracing the wall 21 and carry suitable bearings 38 for the shafts 33 and 35. There may be provided, too, a crossbrace 39 extending horizontally from one inner strut 36 to the other inner struct 36 provided with a bearing 40, having a vertical axis, for a shaft to be subsequently described.

The portions of the means D heretofore described are more or less conventional, but the novel features of the means D include a roller 41 carried at the tip of, preferably, each blade C, by a suitable axle. The axis of rotation of each roller is normal to the axis of rotation of the bosses 32 and 34. Each roller 41 is provided with suitable conventional anti-friction bearings and, preferably, tapers for obvious reasons. These rollers 41 move along circular trackways or circumferential grooves 42 and 43, one for each set of blades and extending into the wall 21. Preferably the trackways are provided as follows: The cylinder or body portion 20 for economy in construction, may be made up of three sections with the edges of the sections smooth and the two edges of the intermediate section, together with the inner edges of the two outermost sections, spaced from the first-mentioned edges, and portions of the inner faces of two bands 44 and 45, welded or otherwise secured to the outer surface of the wall 21, and extending over these edges, constitute the trackways 42 and 43. The rollers 41 roll over the vertical, paralleling faces of the trackways and are spaced from the bands 44 and 45. Thus, it will be seen that there is provided novel support for the blades at locations where such support is generally neglected and distortions or collapsing of the blades, even if of large size and great length and urged by winds of great force, are minimized. However, it has been discovered that additional support is desirable and this is provided by the novel association of the rollers 46 and circular tracks 47 and 48. A roller 46 is, preferably, carried by each blade C intermediate the boss and blade tip and, in the case of the rollers 46, the longitudinal axes of their axles are substantially normal to the axes of rotation of the bosses 32 and 34 and parallel the axes of rotation of the rollers 41. The track 47 may be secured to the outer face of one inner strut 37 and the track 48 secured to the inner face of an outer strut 36 both spaced equal distances from the axes of rotation of the bosses 32 and 34. This additional support for the blades prevents buckling and twisting in high winds and frictional losses are so small that the added structure and weight are more than compensated for by the saving effected in the lowering of damage possibility to the blades and shut downs in order to effect repairs.

Associated with the shafts 33 and 34 is the gearing E shown in Figure 3 which includes, preferably, a pair of bevel gear wheels 55 one fixed to adjacent the inner end of shaft 33, the other fixed to adjacent the inner end of shaft 35 and both meshing with a bevel gear wheel 56 fixed to a substantially vertically disposed shaft 57 which extends downwardly through the bearing 40 through suitable concentrically-disposed openings 58 and 59 in the wall 21 and skirt 25 and thence for operative connection with any suitable device or apparatus to be operated thereby.

The support G, shown more particularly in Figures 1 and 4, embodies a turntable 60 supported by suitable flanged wheels 61 rolling over complementary upper and lower rail sections 62 and 63, disposed as shown in Figure 1 so that tipping of the turntable 60 is prevented. Converging upwardly from the turntable are suitable tower members, including braces or struts 64 which are suitably connected with the housing B. Intermediate the turntable 60 and housing B may be a platform 65 with guard railing, an excess ladder 66 from the turntable to the platform 65 and from the platform to the housing B there being, of course, suitable hatchways in the platform 65 and housing B adjacent the ladders 66. The lower end of the shaft 57 may be journalled in a suitable step bearing 67 below the turntable 60, the latter being provided with a suitable central opening for this shaft.

Carried, for example, at the periphery of the turntable 60 are a plurality of preferably gear-like teeth 68, for a purpose later described in connection with the control means H and more particularly with a gear wheel 170.

Figure 10:
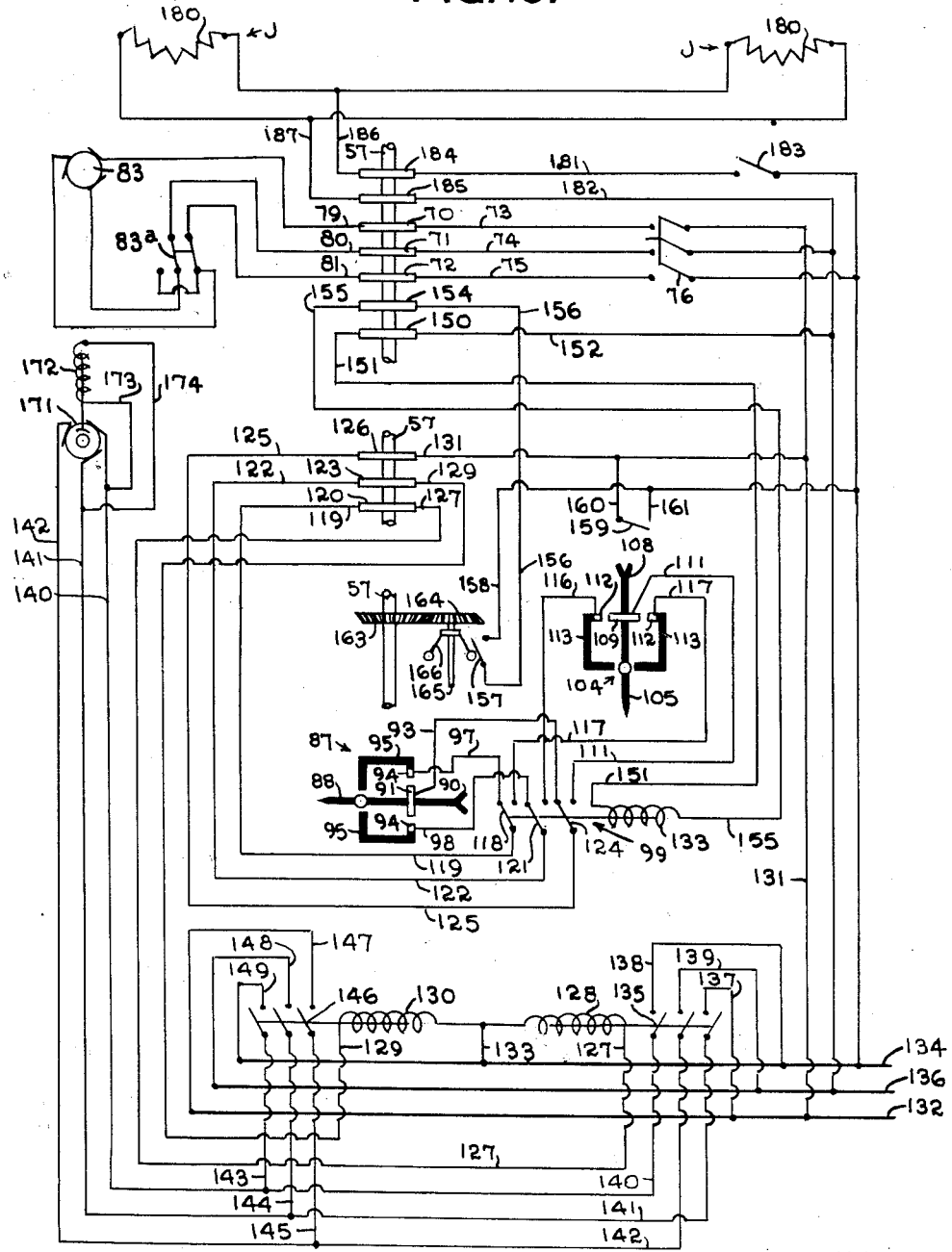
Figure 10 is a wiring diagram of the wind turbine.

The control means H is partly mechanical and partly electrical and shown more particularly in Figure 1. Mounted upon but suitably electrically insulated from the shaft 57 are three spaced-apart slip rings 70, 71 and 72 containing conductive material, this material of each being engaged by a fixed brush, one brush being electrically connected with a conductor 73, another with a conductor 74 and the third with a conductor 75 which extend, in any approved way, to a remote control station, containing a suitable electric switch 76, as shown in Figure 10; with which the conductors are electrically connected for opening and closing the circuits through them. Each slip ring is also engaged by a second fixed brush, one brush being connected with a conductor 79, another brush with a conductor 80 and the third with a conductor 81, all conductors 79, 80 and 81 being supported as by the horizontally-disposed boom 82 carried by the platform 65 from which it juts. Also supported by the boom 82 is a position control means, such as a conventional type B-2 position-control reversible electric motor 83 to which the conductors 79, 80 and 81 are conventionally connected with a suitable switch 83a interposed. The motor 83 has a shaft upon which a bevel gear 84 is mounted and with its teeth meshing with those of a second bevel gear 85 mounted upon a preferably hollow shaft 86 which is journalled in the boom 82 and extends upwardly to an air switch means 87 including a vane 88 carried by the shaft 86. Normally the longitudinal axis of the vane 88 parallels the longitudinal axis of the cylinder 20 and is spaced from the cylinder a sufficient distance so that eddy currents created by movements of the cylinder will not affect it. However, when the vane is rotated on its axis by the motor 83 it will cause changes in the angular position of the cylinder with respect to the direction of the wind and, consequently, change the volume of air passing, as wind, through the cylinder, whereby the extent of power developed by the impellers C may be controlled to fit requirements. By rotating the vane 88 to a position where its longitudinal axis is normal to the longitudinal axis of the cylinder (a rotation of 90°), as when a storm is raging, the change in direction of the vane 88 will set up electro-mechanical operations whereby that the cylinder will be placed crosswise of the wind, as will be subsequently explained.

Referring to Figures 5, 6, and 7 it will be seen that the air switch means 87 is of novel construction. It includes the vane 88 which has a minor degree of oscillation upon the shaft 86, as shown in Figure 7, as by means of a pivot 89 fixed upon the upper end of the shaft 87. The vane 88, intermediate its pivot 89 and its tail 90, has a pair of transversely-extending arms 91 of electricity-conducting material, each carrying an electric contact 92, which contacts are, preferably, connected to the ends of the arms, as by conventional metallic leaf springs. Connected with arms 91 is an electric conductor 93, as shown in Figure 10, for a purpose later detailed.

The contacts 92 are adapted to make contact as the vane 88 oscillates, with either of two fixed contacts 94 spaced a slight distance therefrom and carried by the arms 95 of a yoke 96 fixedly supported upon the hollow shaft 86. From one fixed contact 94 extends a conductor 97 and from the other fixed contact 94 extends a conductor 98. The conductors 93, 97 and 98 may extend through the shaft 86, and lead to three fixed contacts of a triple-pole, double-throw switch 99, actuated by a solenoid 133, as will be subsequently described.

Retraction coil springs 101, under substantially like tension, may diverge from the vane 88, preferably adjacent its head, to the yoke 96 as shown in Figures 5, 6 and 7.

Associated with the assembly last described is air switch means 104, shown in Figure 8, including a vane 105 mounted upon a mast or support 106 for slight rotation thereon, such slight oscillations being substantially the same as the slight rotation described for vane 88. The mast 106 may be supported by any suitable portion of the structure so that it extends above the housing B and so that it moves therewith. Generally, the longitudinal axis of the vane 105 is normal to the longitudinal axis of the housing B and cylinder 20. The only independent movement of the vane 105 is the slight oscillations mentioned.

The vane 105 is preferably substantially like the vane 88, and has, intermediate its pivot 107 and tail 108, a pair of transversely-extending arms 109 of electric conducting material, each carrying an electric contact 110 which may be supported by conventional metallic leaf springs. Connected with the arms 109 is an electric conductor 111 for a purpose subsequently detailed.

These contacts 110 are adapted to make contact, as the vane 105 oscillates with either of two fixed contacts 112 spaced slightly therefrom and carried by the arms 113 of a yoke 114 fixedly secured to the mast 106. From these arms diverge two substantially alike retraction coil springs 101 secured at their opposite ends to the vane 105 preferably between its head 116 and pivot 107. Referring now mainly to Figure 10, from each contact 112 extends a conductor 116 or 117, as the case may be, and each of the three conductors 111, 116 and 117 extends to three fixed contacts of the triple-pole, double-throw switch 99. From each of the three blades of the switch 99 extends a conductor. One blade 118 is adapted to close the circuit through either conductor 97 or 117 and a conductor 119 electrically connected, as by a brush, with a slip ring 120 mounted upon the shaft 57. Another blade 121 is adapted to close the circuit through either conductor 98 to 116 and a conductor 122 electrically connected, as by a brush, with a slip ring 123 also mounted upon the shaft 57. The third blade 124 is adapted to close the circuit through either conductor 93 and 111 and a conductor 125 electrically connected, as by a brush, with a slip ring 126 mounted upon the shaft 57.

The switch 99 is mounted upon any suitable portion of the structure, as the turntable 60.

From the slip ring 120, by means of a brush connection, a conductor 127 extends to one end of the windings of a solenoid 128. From the slip ring 123, by means of a brush connection, a conductor 129 extends to one end of the windings of another solenoid 130. From the slip ring 126, by means of a brush connection, a conductor 131 extends to the main line conductor 132.

The solenoids 128 and 130 have the other ends of their windings connected with a conductor 133 which is, in turn, connected with a main line conductor 134.

Solenoid 128 is adapted to actuate a three-pole switch 135. The three fixed contacts of this switch are connected with the main line conductors 132, 134 and 136 respectively as by leads 137, 138 and 139 respectively. From each blade of the three-pole switch 135 extends a conductor 140, 141 and 142 as the case may be, and as shown in Figure 10.

From these three conductors 140, 141 and 142 extend leads 143, 144 and 145 respectively, to the blades of another three-pole switch 146, actuated by the solenoid 130. The fixed contacts of this switch 146 are connected, as by leads 147, 148 and 149, with the main line conductors 132, 136 and 134 respectively.

In addition to the slip rings described, there are two others mounted upon the shaft 57. One slip ring 150 is contacted by two spaced-apart brushes from which extend conductors 151 and 152 respectively. The conductor 151 extends to one end of the windings of a solenoid 133 which actuates the switch 99, while the conductor 152 extends to the main line conductor 136. The other slip ring 154, is contacted by two spaced-apart brushes from which extend conductors 155 and 156 respectively. The conductor 155 extends to the other end of the windings of solenoid 133 and the conductor 156 extends to one contact of a normally-open trip switch 157 from the other contact of which a conductor 158 leads to the main line conductor 134. A manually-operated switch 159 is disposed in parallel with switch 157 so that manual closing of the circuit may be effected, since leads 160 and 161 extend from switch 159 and connect with conductors 156 and 158 respectively.

Trip switch 157 which, as stated, is normally open, is preferably mechanically closed by a governor means including a bevel gear 163 mounted upon the shaft 57 which meshes with a bevel gear 164 mounted upon a shaft 165 supported, in any approved way, by the tower structure, carrying a conventional centrifugal, balls-carrying governor 166, adapted as the balls thereof recede from the shaft 165 to close the switch 157 as by contact with the handle thereof.

Associated with the electrical means described is an additional electro-mechanical assembly, including a gear wheel 170 the teeth of which are adapted to mesh with the gear-like teeth 68 of the turntable 60. The gear wheel is rotated by a suitable means, as a three-phase A. C. electric motor 171, associated with a conventional magnetic brake 172 mounted to brake the shaft of motor 171. When the motor 171 starts, this brake 172 releases, since it receives its energizing current through leads 173 and 174, connected with conductors 140 and 141 respectively, connected across one phase of the motor. When the current to the motor is interrupted, the brake immediately brakes the motor shaft against rotation, which, of course, immediately stops rotation of the turntable 60. Conductors 140, 141 and 142 constitute the motor in-put circuit and, rotation reversal of the motor 171 is secured by transporting two of its phase wires. By referring to the wiring diagram, it will be seen that when one of the solenoids 128 or 130 is energized, the motor 171 will rotate in one direction and, when the other solenoid is energized, the motor will reverse rotation. For example, closing switch 146 by energizing solenoid 130, may cause clockwise rotation of the shaft of motor 171 and closing switch 135 by energizing solenoid 128 may cause counter-clockwise rotation thereof. Conventional interlocking means between the two solenoids prevent closing of both switches 135 and 146 at the same time.

Before describing the means J, operation of the means H, just described, will be explained. The vane 88 during its limited free rotation, as explained, closes circuits either through conductors 93 and 97 or 93 and 98. In the event circuit between conductors 93 and 97 is closed, there will be current flow through switch blade 118, conductor 119, slip ring 120, conductor 127, windings of solenoid 128, to energize it, lead 133 and main line conductor 134, as well as through blade 124, conductor 125, slip ring 126, conductor 131 and main line conductor 132. If the circuit is closed through conductors 93 and 98, the flow will be through blade 121, conductor 122, slip ring 123, conductor 129, windings of solenoid 130, lead 133, and main line conductor 134, as well as through blade 124, conductor 125, slip ring 126, conductor 131 and main line conductor 132. When solenoid 128 is energized, three-pole switch 135 will close so that there will be current flow through conductors 140, 141 and 142 to the motor 171 for rotation thereof in one direction. When solenoid 130 is energized, three-pole switch 146 will close and there will be current flow through conductors 143, 144 and 145, 140, 141 and 142 to the motor 171 for rotation in another direction.

Vane 105, as it rotates in the limited independent degree stated, closes circuits either through conductors 111 and 116 or conductors 111 and 117. In the first case, there will be flow through blade 118, only if solenoid 153 has been energized to throw switch 99 from the position shown in the wiring diagram to a position where the blades 118, 121 and 124 are in circuit with conductors 116, 117 and 111. When so thrown, from conductor 111 flow will be through blade 124. The flow from conductor 117 is, of course, through blade 121. Solenoid 133 is energized by closing the circuit either at trip switch 157 or at manually-operated switch 159. Actuation of trip switch 157 is effected as follows: Switch 157 is normally open. As wind velocity increases and the blades C cause increased rotation of the shaft 57 as is obvious, when such velocity reaches a dangerous degree, the free ends of the arms of the governor 166 will move away from the shaft 165 and finally contact the switchhandle of switch 157 and cause it to move to a closed position. There will then be current flow through main line conductor 134, conductor 158, switch 157, conductor 156, slip ring 154, conductor 155, windings of solenoid 133, conductor 151, slip ring 150, conductor 152 and main line conductor 136.

As for the means J, shown particularly in Figures 9 and 10, for removing snow and ice accumulations from portions of the means D, that is, from the trackways 42 and 43, this means may include electric heating elements 180 incorporated with the bands 44 and 45, in any approved way, to heat localized portions of them (as the lowermost portions), with current fed thereto by conductors 181 and 182 which are connected with main line conductors (with a switch 183 interposed), leading to brushes contacting slip rings 184 and 185, and with other brushes and conductors 186 and 187 extending to these elements 180. In order to permit melted snow or ice, as well as rain water, to drain from the trackways 42 and 43, drains 189 may be provided, leading from the bottoms of the trackways and through the skirt 25 to the exterior of the housing B.

The shape of the housing B, coupled with the specific disposition of the impellers C, is such that wind, rotating the set 30, for instance in a counter-clockwise direction as viewed from the induction end or mouth 23, is deflected in a clockwise direction and the set 31 thereupon receives the impact of this deflected wind and rotates the set 31 in a clockwise direction, as viewed from the mouth 23.

As for the specific shape of the skirt portion 25, its function is to deflect the wind equally and gradually so as to cause a partial vacuum to the leeward of the housing B. By creating this low pressure area to the rear of the housing it follows that the air entering the cylinder will gain velocity as it rushes toward and into the low pressure area caused by the skirt.

The wall 21 of the cylinder does not diverge nor converge toward either end of the cylindrical portion 20, and the impeller sets are positioned, preferably, well inwardly of its induction and eduction ends. Excessive turbulation is prevented thereby and maximum utilization is made of the wind entering the portion 20.

The air switch means 104 is wholly a safety switch. It performs no useful function during normal operation and does not close the electric circuit until such a time as the velocity of the wind reaches a dangerous degree then, due to the increased rotation of the shaft 57, which causes the governor 166 to close switch 157, so that solenoid 133 will be energized as stated, and result in a rotation of the turntable 60, thus shifting the position of the housing B with respect to the direction of the wind.

It is apparent that, as long as the vane 88 of switch means 87 parallels the direction of the wind, there will be no oscillations of this vane sufficient to close either of the circuits in which it is interposed but, if the wind veers, the vane 88 will be caused to rotate thereby, and close one of the circuits and cause rotation of the turntable until the vane 88 again parallels the direction of the wind. Controlled rotation of the entire structure of air switch 87 causes, as is now obvious, a shift of the housing B with respect to the wind, whereby the degree of power developed may be regulated.

Various changes may be made to the form of the invention herein shown and described without departing from the spirit of the invention or scope of the claims.

What is claimed is:

1. In a wind turbine, an impeller housing, including an open-ended cylindrical body portion; an impeller, including a blade portion; means mounting said impeller for rotation within said body portion on an axis extending longitudinally of said body portion; and means to prevent collapse of said blade portion, including a circular trackway within said body portion, said trackway being disposed with its axis coincident with the axis of rotation of said impeller, the surface of said trackway facing the induction end of said body portion; and a roller rotatably secured to said blade portion and in contact with said surface.

2. In a wind turbine, an open-ended cylindrical body portion including an end section, a section of substantially the same diameter as said first section, and means securing said sections together in spaced apart, end-to-end relation, whereby a space is provided between said ends; an impeller means including a blade; means mounting said impeller means within said body portion for rotation on an axis extending longitudinally of said body portion; and means to prevent collapse of said blade portion, including a roller within said space, with its periphery in contact with said facing edges and provided with an axle secured to said blade portion.

3. In a wind turbine, an impeller housing, provided with an open-ended cylindrical body portion including an end section, a section next adjacent thereto and spaced therefrom and a hoop section in contact with the peripheries of said first two sections and overlaying the space between the facing edges of said first two sections; means securing said hoop section to the other sections; an impeller including a blade portion; means mounting said impeller to rotate on an axis extending longitudinally of said cylindrical body portion; and means to prevent collapse of said blade portion, including a roller within said space, with its periphery in contact with said facing edges and provided with an axle secured to said blade portion.

4. In a wind turbine, an impeller housing having eduction and induction ends; a wind turbine rotatably carried within said housing; means for rotating said housing on a substantially vertical axis, including an electric motor; and electro-mechanical means for selectively varying the degree of rotation of said housing so that said induction end will face the wind at various selected angles, including a vane at the induction end of said housing and normally disposed with its longitudinal axis paralleling the longitudinal axis of said housing, a pair of electric contacts carried by said vane, a pivot for said vane, a support for said pivot, a pair of arms disposed to either side of said vane, closely adjacent thereto and carried by said support, an electric contact carried by each arm and disposed within the path of travel of said first contacts upon oscillation of said vane on said pivot, a three-pole electric switch electrically connected with said contacts and said motor, and means to rotate said support.

5. In a wind turbine, an impeller housing having eduction and induction ends; impeller means within said housing; a shaft; means operatively connecting said shaft with said impeller means; means for rotating said housing on a substantially vertical axis, including an electric motor; and electro-mechanical means for selectively varying the degree of rotation of said housing so that said induction end will face the wind at various selected angles, including a vane at the induction end of said housing and normally disposed with its longitudinal axis paralleling the longitudinal axis of said housing, a pair of electric contacts carried by said vane, a pivot for said vane, a support for said pivot, a pair of arms disposed to either side of said vane, closely adjacent thereto and carried by said support, an electric contact carried by each arm and disposed within the path of travel of said first contacts upon oscillation of said vane on said pivot, a three-pole electric switch electrically connected with said contacts and said motor, an electric circuit, a trip electric switch in said circuit, a solenoid in said circuit, operatively connected with said three-pole switch, means operatively connected with said shaft to close said trip switch when said shaft reaches a predetermined rate of rotation; and means to rotate said support.

6. In a wind turbine, an impeller housing having eduction and induction ends; impeller means within the housing; a shaft operatively connected with said impeller means; means for rotating said housing, including an electric motor; and electro-mechanical means for selectively varying the degree of rotation of said housing by said motor so that said induction end will face the wind at various selected angles, including a vane disposed at the induction end of said housing and normally extending longitudinally thereof, limiting means permitting limited oscillations of said vane; an electric circuit between said vane, limiting means and motor, means for selectively rotating said vane and limiting means, as a unit, and means operatively connected with said shaft to close said circuit when said shaft reaches a predetermined rate of rotation.

7. In a wind turbine, an open-ended impeller housing; impeller means within said housing; a shaft operatively connected with said impeller means; rotating means for rotating said housing, including an electric motor; and means for causing operation of said rotating means to bring said housing broadside to the wind including a vane with its longitudinal axis normally normal to the longitudinal axis of said housing, a pivot for said vane, a support for said pivot, a rigid connection between said support and housing, arms carried by said support, closely adjacent said vane and disposed within the path of rotation of said vane on said pivot, an electric circuit between said vane and motor, a trip switch within said circuit and means operatively connected with said shaft to close said switch when said shaft reaches a predetermined rate of rotation.

8. In a wind turbine, an impeller housing, including a cylindrical body portion provided with a circumferential groove opening into its inner face; an impeller blade, means mounting said blade for rotation within said body portion on an axis extending longitudinally of said body portion; means carried by the free end of said blade and extending into said groove to prevent collapse of said blade in a direction longitudinally of said housing; and means to remove snow and ice from said groove including a heating element closely adjacent said groove, said groove having openings at the lowermost portion of its circumference communicating with the exterior of said body portion.

9. In a wind turbine, an impeller housing provided with an open-ended cylindrical body portion including an end section, a section next adjacent thereto and spaced therefrom, and a hoop section in contact with the peripheries of said first two sections and overlaying the space between the facing edges of said first two sections; means securing said hoop section to the other sections; an impeller including a blade portion; means mounting said impeller to rotate on an axis extending longitudinally of said cylindrical body portion; means to prevent collapse of said blade portion, including a roller within said space, with its periphery in contact with said facing edges and provided with an axle secured to said blade portion; and means to drain liquids from said space, including the walls of conduits extending through said hoop and disposed at the lowermost portion of said hoop.

WALLACE E. RUSHING.

REFERENCES CITED

The following references are of record in the file of this patent:

UNITED STATES PATENTS

| Number | Name | Date |
|---|---|---|
| 31,121 | Holmes | Jan. 15, 1861 |
| 167,347 | Lowe | Aug. 31, 1875 |
| 187,440 | Wheeler | Feb. 13, 1877 |
| 321,985 | Leavitt | July 14, 1885 |
| 500,877 | Foulks | July 4, 1893 |
| 555,806 | Dolsen | Mar. 3, 1896 |
| 649,065 | Martens | May 8, 1900 |
| 1,002,833 | Giddings | Sept. 12, 1911 |
| 1,311,193 | Uecke | July 29, 1919 |
| 1,491,688 | Ford | Apr. 22, 1924 |
| 1,783,669 | Oliver | Dec. 2, 1930 |
| 2,017,961 | Ferral | Oct. 22, 1935 |
| 2,153,055 | Weissmann | Apr. 4, 1939 |

FOREIGN PATENTS

| Number | Country | Date |
|---|---|---|
| 168,108 | Germany | Mar. 10, 1906 |
| 4,959 | France | Sept. 30, 1935 |
| | (Addition to No. 330,141) | |